US011231118B1

(12) United States Patent
Kubricky et al.

(10) Patent No.: US 11,231,118 B1
(45) Date of Patent: Jan. 25, 2022

(54) INTEGRATED ONE WAY VALVE

(71) Applicant: Hanon Systems, Daejeon (KR)

(72) Inventors: Jakub Kubricky, Novy Jicin (CZ); Radim Cech, Novy Jicin (CZ); Radek Macicek, Novy Jicin (CZ); Martin Pavlinak, Novy Jicin (CZ); Jakub Pszczolka, Novy Jicin (CZ); Eric Kesler, Novi, MI (US); Zdenek Vahalik, Novy Jicin (CZ); Pavel Dusek, Novy Jicin (CZ)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/184,680

(22) Filed: Feb. 25, 2021

Related U.S. Application Data

(60) Provisional application No. 63/111,673, filed on Nov. 10, 2020.

(51) Int. Cl.
*F16K 15/02* (2006.01)

(52) U.S. Cl.
CPC ....... *F16K 15/026* (2013.01); *Y10T 137/3185* (2015.04); *Y10T 137/3258* (2015.04); *Y10T 137/3294* (2015.04); *Y10T 137/3331* (2015.04); *Y10T 137/7854* (2015.04); *Y10T 137/7857* (2015.04); *Y10T 137/7932* (2015.04); *Y10T 137/7933* (2015.04); *Y10T 137/7934* (2015.04)

(58) Field of Classification Search
CPC ............. F16K 15/026; Y10T 137/7854; Y10T 137/7857; Y10T 137/7932; Y10T 137/7933; Y10T 137/7934; Y10T 137/3294; Y10T 137/3258; Y10T 137/3185; Y10T 137/3331
See application file for complete search history.

(56) References Cited

U.S. PATENT DOCUMENTS

| | | | | |
|---|---|---|---|---|
| 1,546,527 A | * | 7/1925 | Werner | F04B 53/1037 210/136 |
| 1,595,459 A | * | 8/1926 | Durant | F16K 15/063 137/329.04 |
| 1,890,223 A | * | 12/1932 | Kilzer | E21B 21/10 137/515.3 |
| 1,984,107 A | * | 12/1934 | Baker | E21B 21/10 137/515 |
| 2,225,220 A | * | 12/1940 | Huff | F16K 17/1613 220/89.3 |
| 2,729,238 A | * | 1/1956 | Hite | F16K 27/0218 137/515.7 |

(Continued)

FOREIGN PATENT DOCUMENTS

| | | |
|---|---|---|
| CN | 205715840 U | 11/2016 |
| JP | 6093252 B2 | 3/2017 |

*Primary Examiner* — Craig M Schneider
*Assistant Examiner* — Frederick D Soski
(74) *Attorney, Agent, or Firm* — Shumaker, Loop & Kendrick, LLP; James D. Miller

(57) ABSTRACT

A one way valve cartridge for a flow assembly includes a housing having an axial aperture formed therein. A leading ring is coupled to the housing. A piston is disposed in the housing and is in sliding relationship with the leading ring. The piston is configured to reciprocate between a closed position to seal the axial aperture and an open position to permit a flow of fluid through the axial aperture. A spring urges the piston into the closed position to seal with the housing.

9 Claims, 5 Drawing Sheets

(56) References Cited

U.S. PATENT DOCUMENTS

| | | | | |
|---|---|---|---|---|
| 2,744,727 A * | 5/1956 | Osburn | E21B 21/10 | 137/454.2 |
| 2,750,958 A * | 6/1956 | Baker | F16K 15/063 | 137/515.7 |
| 2,771,091 A * | 11/1956 | Baker | E21B 21/10 | 137/542 |
| 2,804,281 A * | 8/1957 | Osburn | E21B 21/10 | 137/551 |
| 2,844,164 A * | 7/1958 | Robbins | F16K 15/063 | 137/454.6 |
| 2,858,838 A * | 11/1958 | Scaramucci | E21B 21/10 | 137/454.2 |
| 2,870,784 A * | 1/1959 | Walls | E21B 21/10 | 137/543 |
| 2,882,925 A * | 4/1959 | Smolensky | F16K 15/063 | 137/542 |
| 2,900,999 A * | 8/1959 | Courtot | F16K 15/063 | 137/516.25 |
| 2,909,192 A * | 10/1959 | Dobrick | F16K 15/063 | 137/542 |
| 2,927,604 A * | 3/1960 | Johnson | F16K 15/063 | 137/514.5 |
| 2,942,617 A * | 6/1960 | Gilliam | F16K 15/063 | 137/454.6 |
| 2,943,639 A * | 7/1960 | Smith | F16K 15/063 | 137/515.7 |
| 2,945,508 A * | 7/1960 | Schweisthal | F16K 17/0406 | 137/515 |
| 3,070,112 A * | 12/1962 | Fricke | F16K 15/18 | 137/102 |
| 3,419,040 A * | 12/1968 | Thibodeaux | E21B 21/10 | 137/515.7 |
| 3,442,288 A * | 5/1969 | Scaramucci | F16L 17/06 | 137/515 |
| 3,474,808 A * | 10/1969 | Elliott | F16K 15/063 | 137/543 |
| 3,749,122 A * | 7/1973 | Gold | F16K 15/063 | 137/515.7 |
| 3,756,273 A * | 9/1973 | Hengesbach | F16K 15/026 | 137/540 |
| 3,800,824 A * | 4/1974 | Medina | F16K 15/063 | 137/541 |
| 3,945,396 A * | 3/1976 | Hengesbach | F16K 15/026 | 137/496 |
| 3,995,658 A * | 12/1976 | Hager | F16K 15/026 | 137/543 |
| 4,046,280 A * | 9/1977 | Hansen | F16K 17/1613 | 220/89.3 |
| 4,148,338 A * | 4/1979 | Skoli | F16K 15/063 | 137/454.2 |
| 4,368,756 A * | 1/1983 | Carlson | F16K 15/06 | 137/541 |
| 4,428,396 A * | 1/1984 | Wall | F16K 17/18 | 137/493 |
| 4,437,492 A * | 3/1984 | Taylor | F16K 15/063 | 137/543.13 |
| 4,444,214 A * | 4/1984 | Paul, Jr. | F16K 17/16 | 137/68.28 |
| 4,505,289 A * | 3/1985 | Wilson | F16K 17/162 | 137/315.11 |
| 4,622,993 A * | 11/1986 | Taylor | E21B 21/10 | 137/542 |
| 4,819,823 A * | 4/1989 | Kadakia | F16K 17/162 | 220/89.2 |
| 4,951,697 A * | 8/1990 | Fritts | F16K 17/1606 | 116/266 |
| 4,955,407 A * | 9/1990 | Inoue | F16K 15/063 | 137/454.2 |
| 5,050,630 A * | 9/1991 | Farwell | F16K 17/162 | 137/68.25 |
| 5,113,900 A * | 5/1992 | Gilbert | F16K 15/063 | 137/515.5 |
| 5,117,861 A * | 6/1992 | McConnell | F16K 15/04 | 137/515.7 |
| 5,123,591 A * | 6/1992 | Reynolds | F01P 7/16 | 137/454.2 |
| 5,228,469 A * | 7/1993 | Otten | A01G 25/16 | 137/80 |
| 5,261,450 A * | 11/1993 | Betts | F16K 17/0433 | 137/514.7 |
| 5,332,042 A * | 7/1994 | Walter | E21B 34/06 | 137/516.25 |
| 5,370,150 A * | 12/1994 | Nehm | B29C 45/14344 | 137/454.2 |
| 5,411,049 A * | 5/1995 | Colvard | E21B 21/10 | 137/71 |
| 5,462,341 A * | 10/1995 | Koyano | B60T 8/1831 | 137/493.9 |
| 5,607,104 A * | 3/1997 | Naclerio | F01P 7/16 | 236/34.5 |
| 5,704,391 A * | 1/1998 | McGowan, Jr. | F16K 17/12 | 137/454.2 |
| 5,743,291 A * | 4/1998 | Nehm | E03C 1/08 | 137/454.2 |
| 5,881,757 A * | 3/1999 | Kuster | G05D 16/0608 | 137/15.19 |
| 6,039,073 A * | 3/2000 | Messick | F16K 15/063 | 137/515.7 |
| 6,298,869 B1 * | 10/2001 | Strelow | F16K 17/1606 | 137/68.26 |
| 6,814,101 B2 * | 11/2004 | Flauzac | F16K 5/0605 | 137/517 |
| 7,314,238 B2 * | 1/2008 | Robert | A61M 39/10 | 285/101 |
| 7,604,063 B2 * | 10/2009 | Mashburn | E21B 21/10 | 137/513.7 |
| 7,721,757 B2 * | 5/2010 | Ginies | F04B 39/023 | 137/542 |
| 9,315,977 B1 * | 4/2016 | Gass | E03C 1/106 | |
| 9,404,244 B1 * | 8/2016 | Gass | F16K 15/063 | |
| 9,791,079 B2 * | 10/2017 | Considine, Jr | F16L 21/08 | |
| 10,195,414 B2 * | 2/2019 | Siess | A61M 39/1011 | |
| 10,385,983 B2 * | 8/2019 | Ligeti | F16K 17/1606 | |
| 10,444,773 B1 * | 10/2019 | Rowe | F16K 1/126 | |
| 10,738,901 B1 * | 8/2020 | Andersson | F16K 27/0209 | |
| 11,067,467 B2 * | 7/2021 | Gamache | F16L 19/12 | |
| 2003/0080554 A1 * | 5/2003 | Schroeder | F16L 23/18 | 285/125.1 |
| 2003/0084941 A1* | 5/2003 | Fischer | F16K 15/026 | 137/541 |
| 2003/0098163 A1* | 5/2003 | Hebert | E21B 21/10 | 166/381 |
| 2003/0116740 A1* | 6/2003 | Schroeder | F16K 15/063 | 251/149.6 |
| 2003/0188783 A1* | 10/2003 | Vicars | F16K 15/063 | 137/541 |
| 2003/0214130 A1* | 11/2003 | Schroeder | F16L 21/08 | 285/205 |
| 2004/0045607 A1* | 3/2004 | Lammers | F16K 15/063 | 137/543 |
| 2006/0278280 A1* | 12/2006 | Yang | F16K 15/063 | 137/542 |
| 2007/0181189 A1* | 8/2007 | Kralick | F16K 17/403 | 137/515 |
| 2007/0295411 A1* | 12/2007 | Schwegman | F16K 15/063 | 137/542 |
| 2008/0210310 A1* | 9/2008 | Gilcher | E03C 1/104 | 137/215 |
| 2009/0145487 A1* | 6/2009 | Holden | F16K 15/025 | 137/315.04 |
| 2011/0210545 A1* | 9/2011 | Kesler | F16L 41/086 | 285/336 |
| 2011/0214755 A1* | 9/2011 | Kesler | B60H 1/00485 | 137/468 |
| 2013/0092864 A1* | 4/2013 | Andersson | F16K 15/063 | 251/337 |
| 2016/0169397 A1* | 6/2016 | Ho | F16K 15/026 | 137/540 |

(56) References Cited

U.S. PATENT DOCUMENTS

| | | | |
|---|---|---|---|
| 2017/0037989 A1* | 2/2017 | Kuo | E03C 1/108 |
| 2017/0159834 A1* | 6/2017 | Jeon | B60T 8/341 |
| 2017/0368903 A1* | 12/2017 | Kesler | F16K 1/422 |
| 2018/0010719 A1* | 1/2018 | Kesler | F16L 21/002 |
| 2018/0195630 A1* | 7/2018 | Lammers | F16K 15/026 |
| 2018/0347731 A1* | 12/2018 | Kesler | F16L 19/0218 |
| 2019/0040966 A1* | 2/2019 | Myers | F04B 53/1087 |
| 2019/0063607 A1* | 2/2019 | Kesler | F28F 9/0256 |
| 2019/0128100 A1* | 5/2019 | Andersson | E21B 34/08 |
| 2019/0195211 A1* | 6/2019 | Sung | F04B 27/08 |
| 2019/0219182 A1* | 7/2019 | Yamamoto | B01D 35/153 |
| 2019/0383407 A1* | 12/2019 | McLean Pe | F16K 15/026 |
| 2020/0047592 A1* | 2/2020 | Kesler | B60H 1/00571 |
| 2020/0049299 A1* | 2/2020 | Kesler | F16L 21/04 |

* cited by examiner

INTEGRATED ONE WAY VALVE

CROSS REFERENCE TO RELATED APPLICATIONS(S)

This application claims the benefit of U.S. Provisional Application No. 63/111,673, filed on Nov. 10, 2020. The entire disclosure of the above application is hereby incorporated herein by reference.

FIELD OF THE INVENTION

The invention relates to a valve, and more particularly to an integrated one way valve for a conduit.

BACKGROUND OF THE INVENTION

An automobile typically includes an air conditioning (A/C) system. The A/C system includes a refrigerating circuit. Components of the A/C system include a compressor, an evaporator of a vaporizer, a condenser or a gas cooler, and an expansion device, with conduits connecting each of the components.

One way valves or check valves are used in the conduits to permit flow through the conduit in one direction and blocking flow in an opposite direction. One way valves facilitate proper distribution of refrigerant through the conduits and prevent refrigerant from accumulating in conduit loops when not in operation such as in heat pump systems, for example. Typically, opening of the valve is caused by a pressure difference between an inlet of the valve and an outlet of the valve. The valve is "normally closed," wherein a spring urges a ball, disc, or other structure towards a seat, thereby blocking a flow through the valve. One way valves of the prior art include a large aluminum housing block disposed between two connectors or block fittings. Thus, the housing block requires two connections, one at each of the connectors. Accordingly, the housing block undesirably adds weight to the system and is more complex. Because of the complexity, maintenance of the valves becomes cumbersome. The two connections also provide additional avenues for leakage. Additionally, the check valves of the prior art cause a large pressure drop to the fluid moving therethrough.

It is desirable to provide a simplified check valve wherein package size, weight, and cost are minimized and efficiency and simplicity is maximized.

SUMMARY OF THE INVENTION

Consistent and consonant with the invention, a simplified check valve wherein package size, weight, and cost are minimized and efficiency and simplicity is maximized has surprisingly been discovered.

In one embodiment, a one way valve cartridge comprises a housing having an axial aperture formed therein. A leading ring is coupled to the housing. A piston is disposed in the housing and slidingly coupled to the leading ring. The piston is configured to reciprocate between a closed position and an open position. A spring urges the piston into the closed position to seal with the housing.

In another embodiment, a one way valve comprises a one way valve cartridge configured to be received in a first conduit; a first fitting configured to receive the first conduit; and a second fitting cooperating with the first fitting to join the first conduit to a second conduit.

BRIEF DESCRIPTION OF THE DRAWINGS

The above-mentioned, and other features and objects of the inventions, and the manner of attaining them will become more apparent and the invention itself will be better understood by reference to the following description of an embodiment of the invention taken in conjunction with the accompanying drawings, wherein.

DETAILED DESCRIPTION OF THE INVENTION

Figure 1:
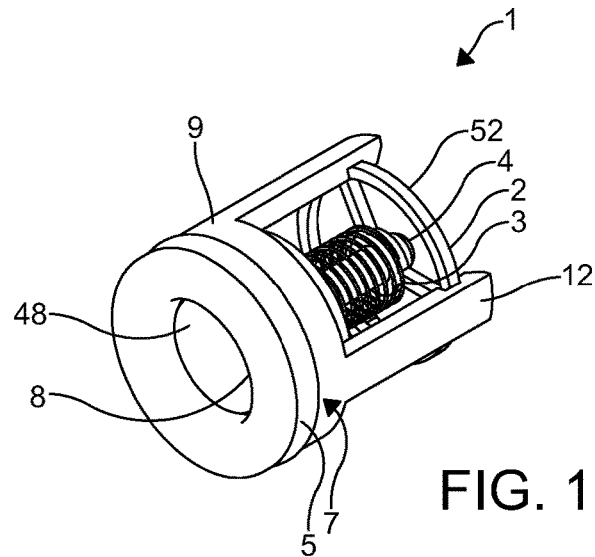
FIG. 1 is a perspective view of a one way valve cartridge according to an embodiment of the present disclosure.
Figure 2:
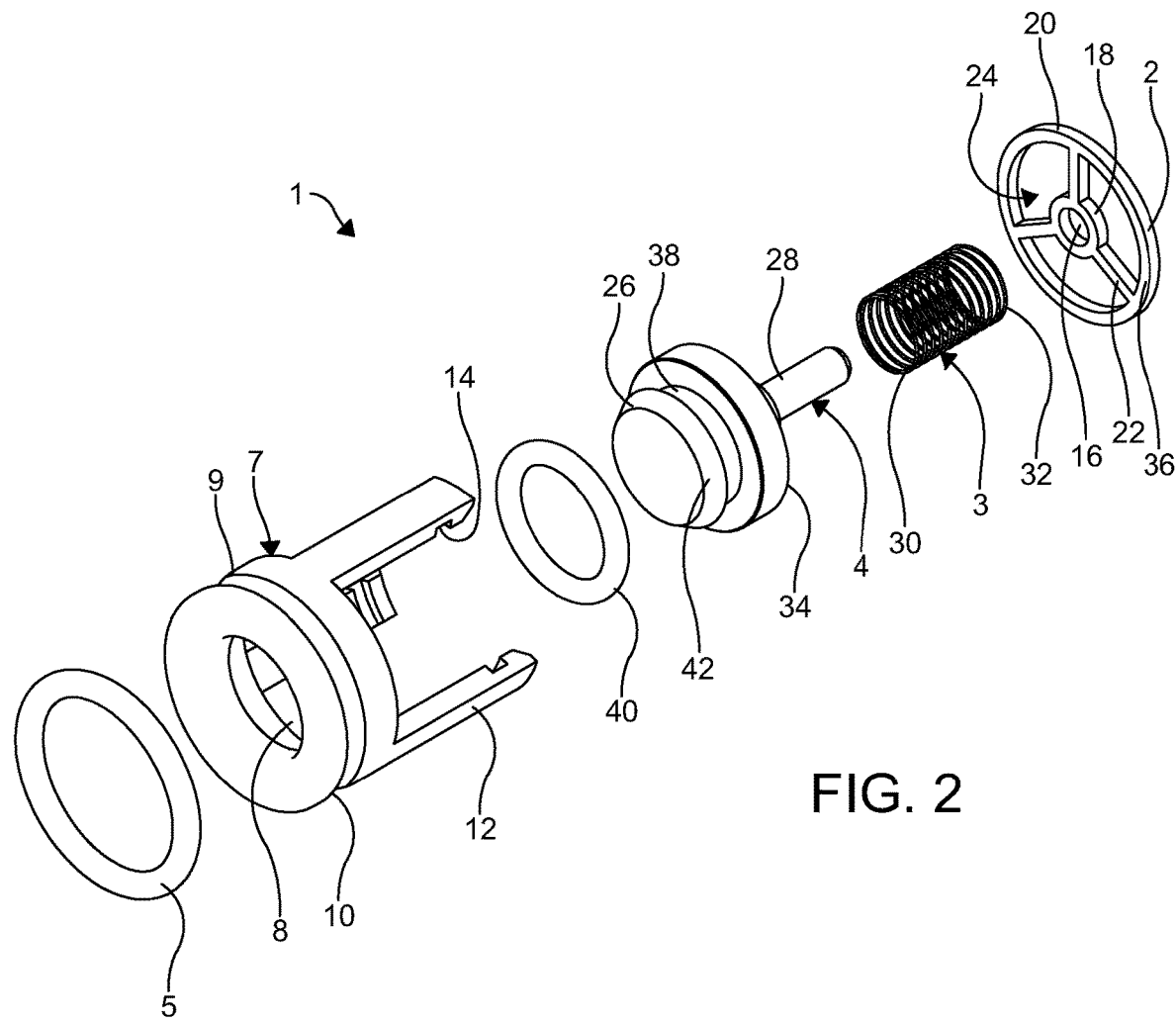
FIG. 2 is an exploded perspective view of the one way valve cartridge of FIG. 1.

The following detailed description and appended drawings describe and illustrate various exemplary embodiments of the invention. The description and drawings serve to enable one skilled in the art to make and use the invention, and are not intended to limit the scope of the invention in any manner. As used herein, the term "substantially" means "mostly, but not perfectly" or "approximately" as a person skilled in the art would recognize in view of the specification and drawings. As used herein the term "about" means "reasonably close to" as a person skilled in the art would recognize in view of the specification and drawings. With respect to the methods disclosed, the steps presented are exemplary in nature, and thus, the order of the steps is not necessary or critical.

Where any conflict or ambiguity may exist between a document incorporated by reference and this detailed description, the present detailed description controls.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer.

As used herein, the term "seal" refers to a feature configured to militate against flow therethrough or between to components. Seals can refer to an o-ring, gasket, shoulder, rim, flange, a paste, a combination thereof, or similar. As shown in the figures, the seal is generally shown as an o-ring or gasket for illustration purposes only. The seals can typically be formed from a flexible and resilient plastic or rubber. However, it is understood the seals can be formed from a metal, wood, or other liquid sealant that can be solidified.

FIGS. 1-4 show a check valve or a one way valve cartridge 1 according to an embodiment of the invention. The cartridge 1 is configured for disposal and structural arrangement within a flow assembly 100, described in further detail herein below with reference to FIGS. 3A-4, for an air conditioning system of a vehicle. The flow assembly 100 conveys a fluid, such as a refrigerant, between heat transferring components (not shown). However, it is understood the flow assembly 100 can be any fluid transferring assembly for any system such as an engine cooling system of a vehicle, a heating and cooling system for buildings, a water conveying system, a coolant conveying system, a vapor or gas conveying system, or any other fluid system requiring the use of a one way valve or check valve including the use of conduits, hoses, tubing, and the like.

The cartridge 1 includes a housing 7. As shown, the housing 7 is substantially cylindrical, although other shapes can be employed as desired. An axial aperture 8 is formed in the housing 7. The axial aperture 8 is formed through a ring portion 9 of the housing 7. The ring portion 9 includes an annular channel 10 formed in an outer surface thereof. The channel 10 is configured to receive an outer seal 5 therein. The housing 7 further includes an annular array of axially extending supports 12. In the embodiment shown, three of the supports 12 are shown, although more or fewer of the supports 12 may be used as desired. As shown, the supports 12 are radially equally spaced from each other with respect to circumference of the ring portion 9. However, it is understood the supports 12 may be randomly or unequally spaced from each other if desired.

A channel 14 is formed in each of the supports 12 adjacent a distal end of the supports 12. The channel 14 is configured to receive a peripheral portion of a leading ring 2. The leading ring 2 is substantially disc shaped with a central aperture 16 and includes an inner ring 18 and an outer ring 20. The leading ring 2 can be formed from a metal, a plastic, or a hybrid thereof. As illustrated, the inner ring 18 which forms the central aperture 16 is connected to the outer ring 20 by an annular array of radially outwardly extending spokes 22. The inner ring 18, the outer ring 20, and the spokes 22 cooperate to form spaces 24 between adjacent ones of the spokes 22. The spaces 24 are configured to convey the fluid through the cartridge 1.

A piston 4 is received in the housing 7 radially inwardly of the array of supports 12. The piston 4 includes a head portion 26 and a stem portion 28. A distal end of the stem portion 28 is received in the central aperture 16 of the leading ring 2. Although, it is understood the stem portion 28 can be received though alternate apertures that can be non-centrally positioned, if desired. A spring 3 surrounds the stem portion 28. A first end 30 of the spring 3 abuts an inner end surface 34 of the head portion 26 and a second end 32 of the spring 3 abuts an inner surface 36 the leading ring 2. As a result of the position of the spring 3 with respect to the head portion 26 and the leading ring 2, the spring 3 urges the piston 4 towards the ring portion 9 of the housing 7. The piston 4 is configured to reciprocate between a closed position and an open position against the force of the spring 3.

An annular channel 38 is formed in an outer surface the head portion 26 of the piston 4 and is configured to receive an inner seal 40 therein. The head portion 26 with the inner seal 40 is configured to be received in and seat with the ring portion 9 of the housing 7 to seal the axial aperture 8 of the housing 7. A chamfer 42 is formed on an end of the head portion 26 adjacent and extending from the annular channel 38 of the head portion 26. The chamfer 42 facilitates guiding the piston 4 into engagement with the ring portion 9 of the housing 7 to seal the axial aperture 8 of the housing 7. The chamfer 42 also facilitates an efficient flow of the fluid through the cartridge 1 when the piston 4 is in the open position. The chamfer 42 has an angle α with respect to the outer surface of the head portion 26 of the piston 4. Favorable results have been obtained when the angle α is between about 20 degrees to 50 degrees. Further favorable results have been obtained when the angle α is about 30 degrees. Although, the angle α can be between about 10 degrees to 80 degrees.

The inner surface of the ring portion 9 of the housing 7 includes an inner shoulder 44 configured as a stop for the head portion 26 of the piston 4. The shoulder 44 is angled similarly to the angle α of the chamfer 42 of the head portion 42 to receive and properly seal the head portion 26 with the ring portion 9 of the housing 7. A chamfer 46 is formed on the inner surface of the ring portion 9 at an inlet 48 of the ring portion 9. The chamfer 46 is formed at an angle μ between about 20 degrees to 50 degrees.

Figure 5A:
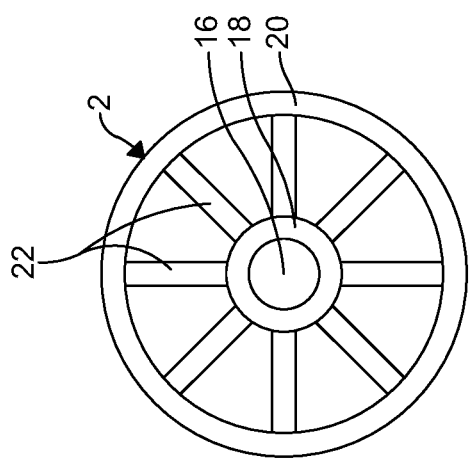
FIG. 5A is a perspective view of the spring and seat apparatus of FIGS. 1-2 according to another embodiment of the disclosure.
Figure 5B:
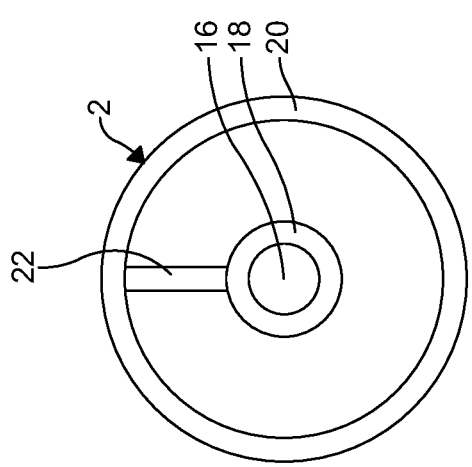
FIG. 5B is a plan view of the spring and seat apparatus of FIGS. 1-2 according to yet another embodiment of the disclosure.
Figure 5C:
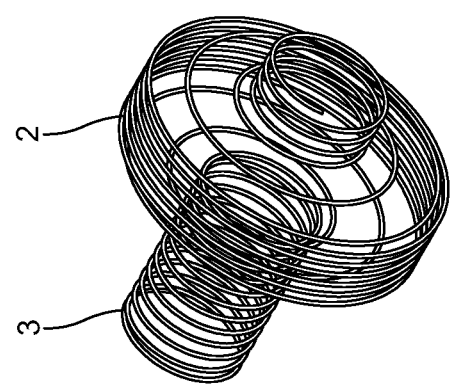
FIG. 5C is a perspective view of the spring and seat apparatus of FIGS. 1-2 according to yet another embodiment of the disclosure.

In alternate embodiments, shown in FIGS. 5A to 5C, the leading ring 2 and spring 3 can include alternate embodiments. For example, as shown in FIG. 5A, the leading ring 2 is configured as a spring and as such is configured to bias with the spring 3 dependent on a force on the spring 3. In such an embodiment, the leading ring 2 would still be received in the channels 14 of the supports 12. In. FIG. 5B, the leading ring 2 includes one of the spokes 22 and in FIG. 5C, the leading ring 2 includes seven of the spokes 22. However, it is understood the spokes 22 can be in the range of about one to eight. The spokes 22 can also be formed with alternate cross-sectional shapes besides a substantially elongated rectangular shape. For example, the spokes 22 can have a substantially diamond, polygonal, ovular or circular, triangular, or any other cross-sectional shape as desired.

Figure 6A:
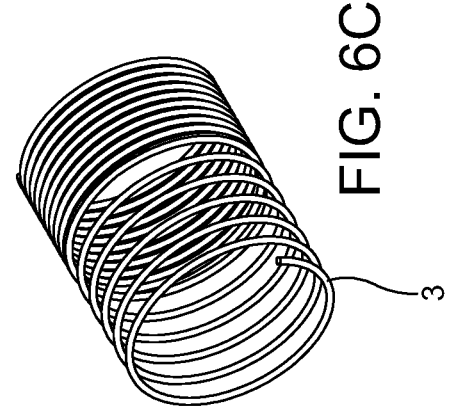
FIG. 6A is a perspective view of a spring of the one way valve of FIGS. 1-2.
Figure 6B:
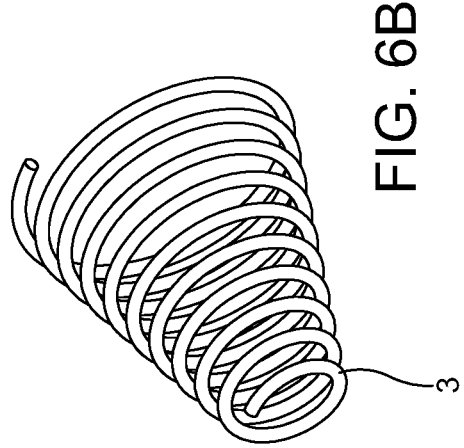
FIG. 6B is a perspective view of the spring of the one-way valve according to another embodiment of the disclosure.
Figure 6C:
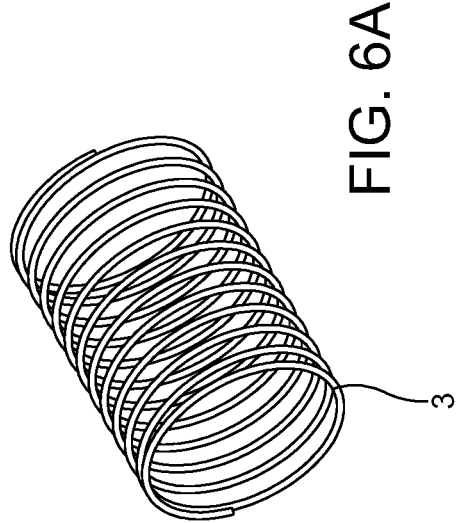
FIG. 6C is a perspective view of the spring of the one-way valve according to yet another embodiment of the disclosure.

As shown in FIGS. 6A-6C, various embodiments of the spring 3 are illustrated. For example, as shown in FIG. 6A, the spring 3 can be configured as a standard spring with a substantially constant outer diameter with a constant spring rate (K). As shown in FIG. 6B, the spring 3 can have a conical shape with a variable spring rate (K). As shown in FIG. 6C, the spring 3 can have portions thereof with varying coil spacing or diameters and variable spring rates (K).

Figure 3A:
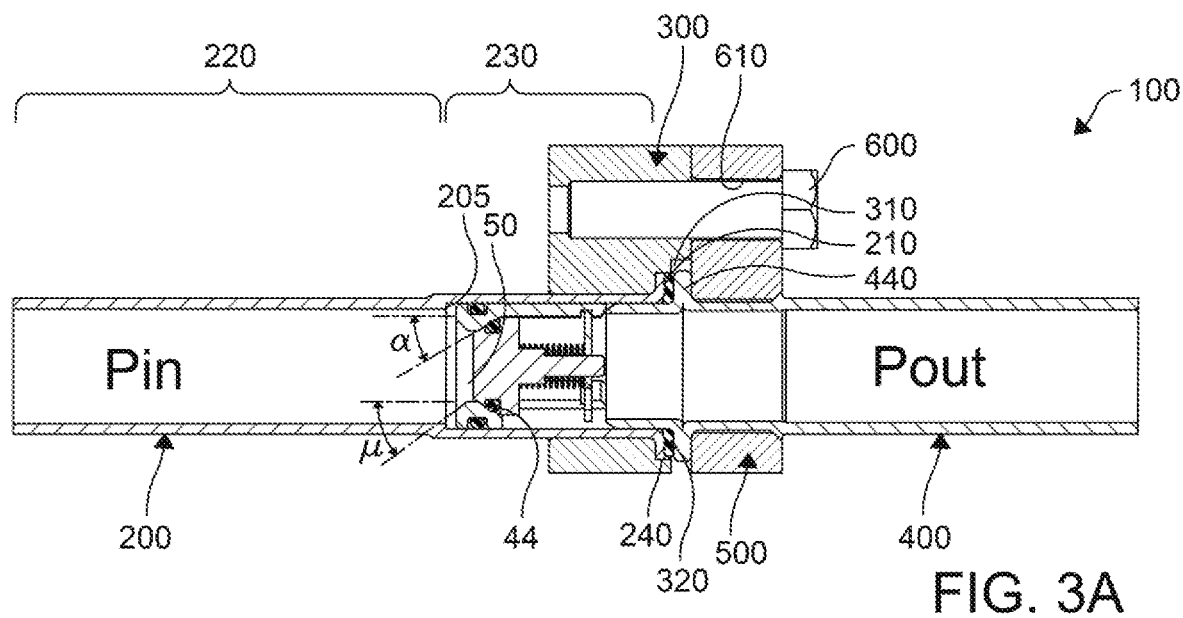
FIG. 3A is a cross-sectional view of the one way valve cartridge of FIGS. 1-2 inserted into a flow system according to an embodiment of the disclosure, wherein the one way valve cartridge is in a closed position.
Figure 4:
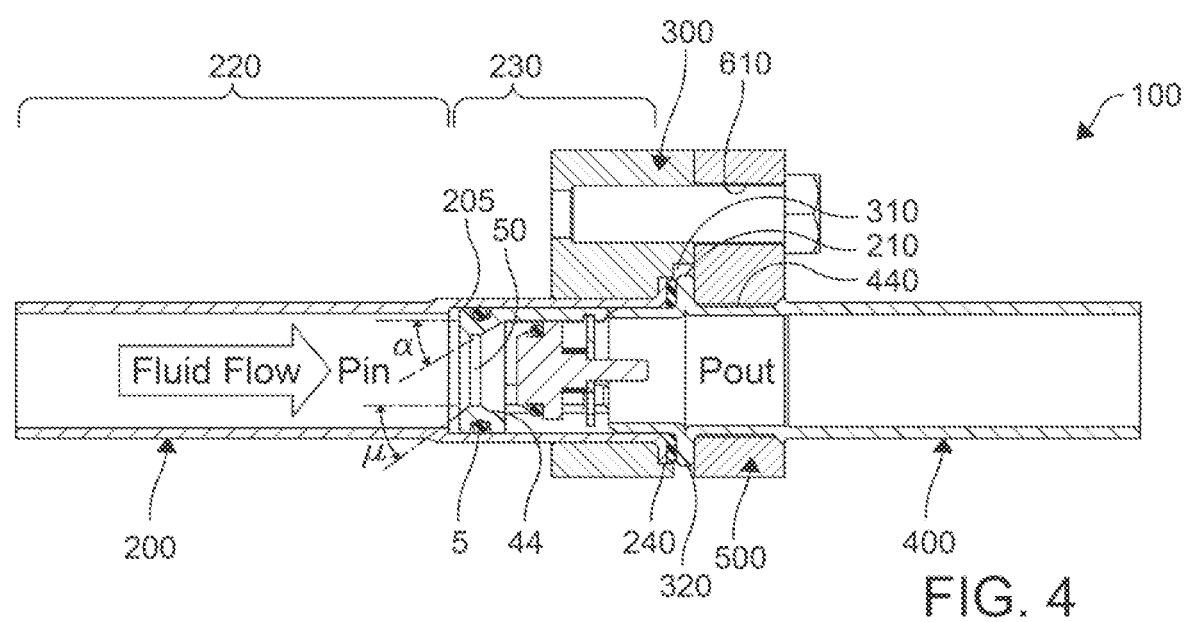
FIG. 4 is a cross-sectional view of the one way valve of FIGS. 1-3 in an open position.

The cartridge 1 is configured to be received in a flared end 210 of a female conduit 200 of the flow assembly 100, as shown in FIGS. 3A and 4. The flared end 210 of the female conduit 200 may be formed during an end forming process. The female conduit 200 includes a first portion 220 having an inner diameter and a second expanded portion 230 having an inner diameter, wherein the inner diameter of the second portion 230 is greater than the inner diameter of the first portion 220. In an embodiment, an expansion ratio, expressed in percentages, of the inner diameter of the second portion 230 to the inner diameter of the first portion 220 is in a range of about 101 percent to 165 percent.

The cartridge 1 is received in the second portion 230 of the female conduit 200. A stop 205 militates against the cartridge 1 moving beyond the second portion 230 of the female conduit 200. The cartridge 1 has a throat flow area 50 with an inner diameter. Preferably, a ratio, expressed in percentages, of the inner diameter of the throat flow area 50 to the inner diameter of the first portion 220 of the female conduit 200 is 50 percent to 125 percent.

The head portion 26 of the piston 4 is inserted into the flared end 210 of the female conduit 200 as indicated by the arrow. The outer seal 5 abuts and seals against an inner wall of the second portion 230 of the female conduit 200, thereby preventing undesired flow around an outside of the one way valve cartridge 1. The female conduit 200 is disposed in an aperture formed in a female connector or fitting 300. A distal end of the flared end of the female conduit 200 includes a flange 240 formed thereon. The flange 240 may be formed during an end forming process and is configured to be received in an annular channel 310 formed in the female fitting 300.

As shown, a ring seal 320 abuts the flange 240 of the female conduit 200. An end of a male conduit 400 is received in the female conduit 200 and is configured to abut the cartridge 1 and urge the one way valve cartridge 1 into a desired position against the stop 205 formed by the interface of the first portion 220 and the second portion 230 away from the end of the female conduit 200. A flange 440 is formed on the male conduit 400 spaced from the end of the male conduit 400. The flange 440 may be formed during an end forming process. A first side of the flange 440 of the male conduit 400 is configured to abut the ring seal 320. A male connector or fitting 500 abuts a second side of the flange 440 of the male conduit 400. A fastener 600 such as a bolt, for example, is received in fastener holes 610 formed in each of the female fitting 300 and the male fitting 500 to couple the female fitting 300 to the male fitting 500. The coupling of the female fitting 300 to the male fitting 500 causes a fluid tight abutment of the respective flanges 240, 440 of the female conduit 200 and the male conduit 400 with the ring seal 320, and positions the one way valve cartridge 1 within the female conduit 200 in the desired position.

A closed position of the cartridge 1 is shown in FIG. 3A. In the closed position, the cartridge 1 is sealed to prevent a flow of the fluid, such as a refrigerant, therethrough ($p_{in} < p_{out}$). This occurs when pressure flowing out $P_{out}$ is higher than pressure flowing in $P_{in}$. The sealing between the female conduit 200 and the housing 7 is accomplished by the outer seal 5. The higher pressure flowing out $P_{out}$ of the fluid will urge the piston 4 to seal against the chamfer 42 of the inner shoulder 44 the housing 1. The sealing between the piston 4 and the housing 1 is accomplished by the inner seal 40. In the event a minimal or negligent pressure difference exists between the inlet 48 and an outlet 52 of the cartridge a, a seating force of the piston 4 against the housing 7 is caused by the spring 3.

An open position of the one way valve cartridge 1 is shown in FIG. 4, wherein there is a pressure difference in the flow direction ($P_{in} > P_{out}$). This occurs when pressure flowing out $p_{out}$ is lower than the pressure flowing in $p_{in}$. The fluid flow causes the piston 4 to move to the open position away from the inner shoulder 44 of the housing 7. The openings 8 formed in the housing 7 and the spaces 24 of the leading ring 2 minimize a pressure drop of the fluid flowing through the cartridge 1. Preferably, a ratio of the distance Dis between the inner wall of the second portion 230 of the female conduit 200 and the head portion 26 of the piston 4 causing the fluid to flow through the cartridge 1 to the inner diameter Di of the first portion 220 of the female conduit 200 is 50 percent to 210 percent.

Figure 3B:
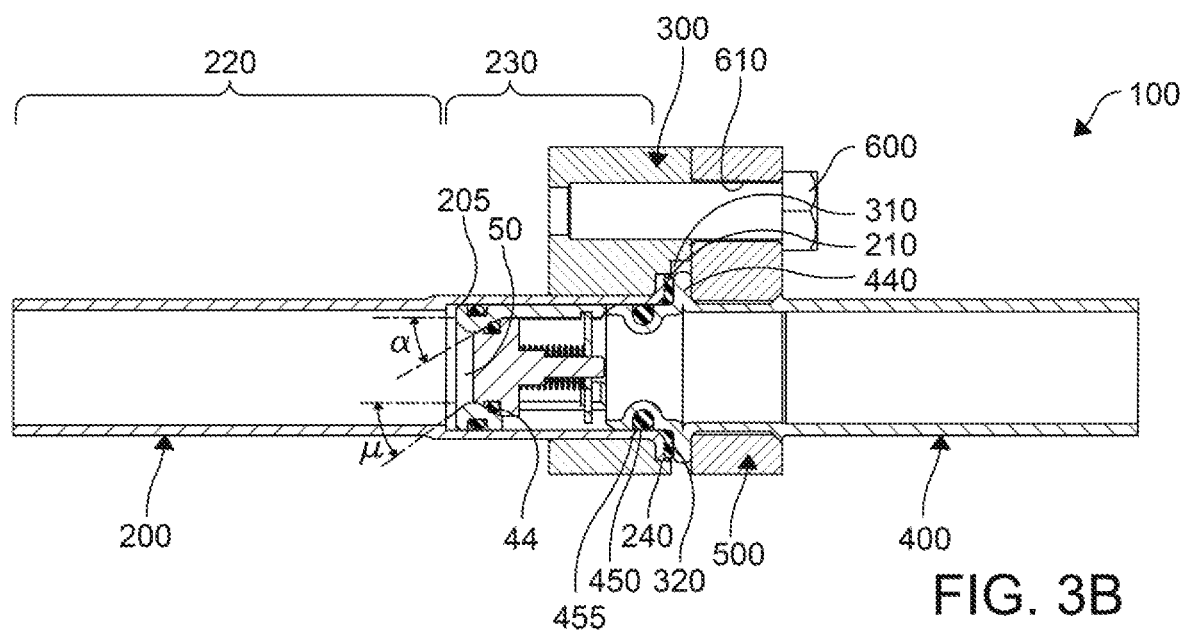
FIG. 3B is a cross-sectional view of the one way valve cartridge of FIGS. 1-2 inserted into a flow system according to an alternate embodiment of the disclosure, wherein the one way valve cartridge is in a closed position.
Figure 3C:
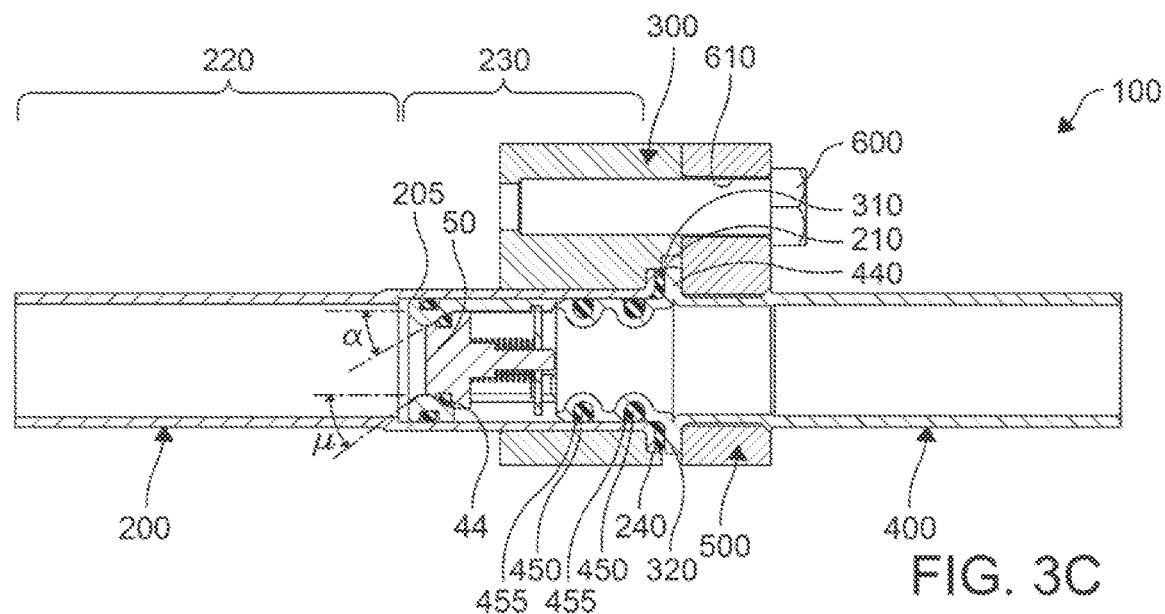
FIG. 3C is a cross-sectional view of the one way valve cartridge of FIGS. 1-2 inserted into a flow system according to another alternate embodiment of the disclosure, wherein the one way valve cartridge is in a closed position.
Figure 3D:
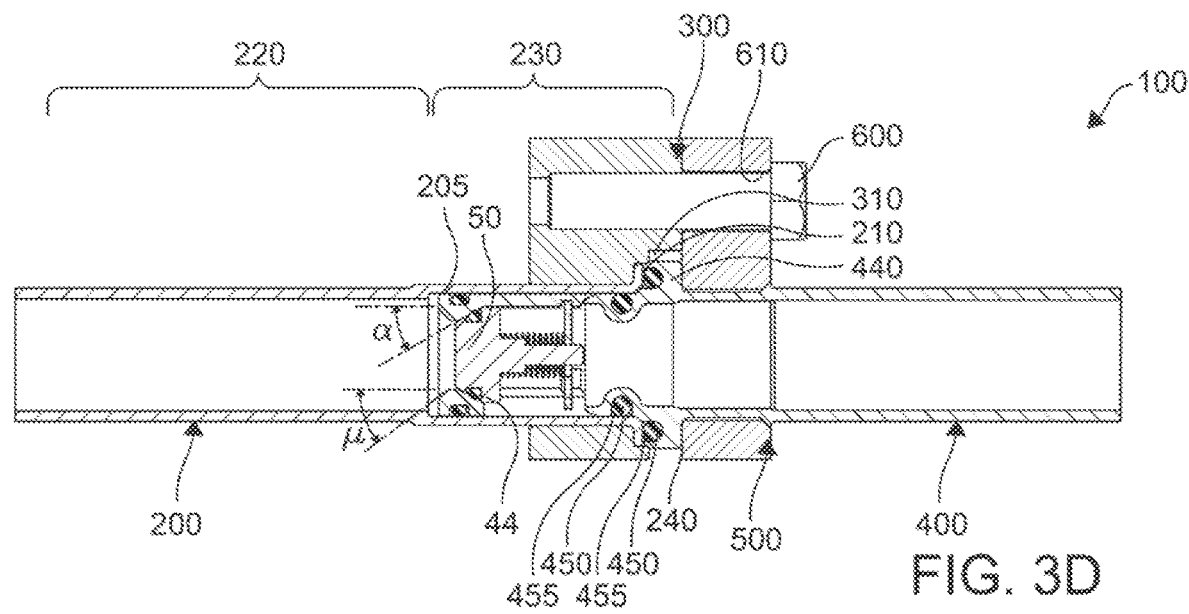
FIG. 3D is a cross-sectional view of the one way valve cartridge of FIGS. 1-2 inserted into a flow system according to yet another alternate embodiment of the disclosure, wherein the one way valve cartridge is in a closed position.

Alternate embodiments of the flow assembly 100 of the present disclosure as shown in FIGS. 3B-3D, are shown representing various sealing configurations. Similar reference numerals as those used in FIGS. 1-3A and 4 to reference features of the flow assembly 100 are used in FIGS. 3B-3D to reference similar features for convenience. As shown in FIG. 3B, a secondary seal 450 is disposed about the male conduit 400 in a channel 455 formed on an outer surface of the male conduit 455 to facilitate additional sealing between the male conduit 400 and the female conduit 200. It is understood more than or fewer of the secondary seals 450 can be formed in the outer surface of the male conduit 400 as desired such as shown in FIG. 3C. Additionally, as shown in FIG. 3C, the male conduit 400 can exclude the flange 440. In another embodiment, shown in FIG. 3D, the secondary seal 450 can be disposed between the flanges 240 and 440 of the female conduit 200 and the male conduit 400, respectively.

The components of the cartridge 1 can be formed from a plastic, a metal from a cast forming process, machined process, or stamped process, or a combination thereof. Examples of materials used to form the components of the cartridge can be aluminum, steel alloy, stainless steel, nylon, acetal, or any other material as desired in accordance with the disclosure.

The one way valve cartridge 1 of the present invention provides an integrated solution for the fittings instead of cumbersome, bulky, multi-component systems and housing of known valves. Further, a pressure drop of a fluid flowing through the valve is minimized. Finally, the one way valve cartridge 1 minimizes the number of parts because only one fitting connection is necessary, thereby reducing the package requirements and minimizing a complexity and a cost thereof.

The invention is not limited to the exemplary embodiments described above. Rather, one skilled in the art can also derive other variants of the invention therefrom without departing from the subject matter of the invention. In particular, all the individual features described in conjunction with the exemplary embodiments can also be combined in other ways without departing from the scope of the invention.

What is claimed is:
1. A one way valve cartridge for a flow assembly comprising:
   a housing having an axial aperture formed therein;
   a leading ring coupled to the housing, wherein the housing includes an annular array of axially extending supports, wherein the leading ring includes an inner ring and an outer ring, wherein a channel is formed in each of the supports adjacent a distal end of the support and receives the outer ring of the leading ring;

a piston disposed in the housing and in sliding relationship with the leading ring, the piston reciprocates between a closed position and an open position; and
a spring urging the piston into the closed position.

2. The one way valve cartridge of claim 1, wherein the annular array of axially extending supports includes three supports.

3. The one way valve cartridge of claim 1, wherein the leading ring includes a central aperture which receives a portion of the piston, and a plurality of spokes extending from the inner ring to the outer ring to form a plurality of spaces between the spokes for conveying the flow of fluid through the leading ring.

4. The one way valve cartridge of claim 1, wherein the housing includes an annular channel formed in an outer surface thereof, the annular channel configured to receive an outer seal.

5. The one way valve cartridge of claim 1, wherein the piston includes a head portion and a stem portion, the head portion sealing with the housing in the closed position and the stem portion received through the leading ring.

6. The one way valve cartridge of claim 5, wherein the head portion includes an annular channel receiving an inner seal configured to form a seal between the head portion of the piston and an inner surface of the housing.

7. The one way valve cartridge of claim 6, wherein a chamfer is formed on an end of the head portion adjacent the annular channel of the head portion.

8. The one way valve cartridge of claim 5, wherein the spring extends between the head portion of the piston and the leading ring.

9. The one way valve cartridge of claim 8, wherein the spring is configured as a spring with a variable spring rate.

* * * * *